Patented July 23, 1935

2,008,815

UNITED STATES PATENT OFFICE 2,008,815

PROCESS FOR PREVENTING ADHESION OF FILMS

Jacques Edwin Brandenberger, Neuilly, and Paul Vanet, Le Vesinet, France, assignors to Du Pont Cellophane Company, Inc., New York, N. Y., a corporation of Delaware No Drawing. Application January 22, 1932, Serial No. 588,230. In France January 23, 1931

14 Claims. (Cl. 91—68)

This invention relates to the manufacture of transparent sheets or films. The invention will be described with particular reference to the manufacture of cellulose hydrate films by the viscose process but the invention is equally applicable to all similar sheets or films.

Films of regenerated cellulose as manufactured from solutions of sodium cellulose xanthate, otherwise called viscose, are very smooth and lustrous. These films are usually wound into rolls which may later be cut into sheets and stacked to a considerable thickness before wrapping and delivering. In these rolls and packages the air is squeezed out between contiguous sheets, which adhere to each other as if they were glued. This condition becomes so bad in some instances that the piled sheets form a veritable block from which it is almost impossible to remove individual sheets. The thinner the film, the moister the film, and the more glycerin or other softening agent which the film contains, the greater becomes this adhesion.

An attempt has been made to overcome the adhesive tendency inherent in these films by the use of a thin layer of talcum powder. This method has a disadvantage, however, that, while it lessens the adhesion of the sheets, it stains the film.

It is an object of this invention to prepare films of the character described in which the tendency to adhesion is markedly reduced or entirely eliminated. Other objects of the invention will be in part apparent and in part set forth in the following description.

The objects of this invention are accomplished, generally speaking, by coating the film with a thin layer of sodium silicate or of sodium silicate and a lime salt.

The sodium silicate is best applied to the film in the manufacturing process. A very satisfactory set-up is secured by arranging a sodium silicate bath in the process just before the drying step. By passing the film through the bath and into the driers a substantially imperceptible layer of sodium silicate will be applied to the surface of the sheet. Films so coated when rolled or piled do not exhibit the objectionable tendency to adhesion which is characteristic of films not so treated.

The greatest advantage can be obtained by combining the glycerin (softener) bath with the sodium silicate bath. Separate baths can be used but, if the glycerin bath comes before the sodium silicate bath, there is an objectionable tendency for the film to lose some of its glycerin.

Many modifications are possible in our process. For instance, the alkalinity of the silicate may be more or less neutralized. Another modification which may be adopted consists in adding lime salts to the sodium silicate solution in which case the completed film will bear on its surface a mixture of silica and insoluble lime salts in a thin and practically imperceptible form. Another modification consists in forming the insoluble coating on the surface of the film. This can be done by passing the film through two baths, the first containing a solution which will react with the second to form an insoluble salt on the surface of the film. This process is successfully used with sodium silicate in the first bath and a soluble lime salt in the second bath.

Other products (such as sodium carbonate, sodium bicarbonate, the alkaline oxalates, sodium aluminate) which are capable of giving a slight surface precipitate of insoluble lime salts, or of being dissociated to leave a thin insoluble surface deposit serve the same purpose as sodium silicate.

The process is applicable not only to regenerated cellulosic sheets but may be applied to any sheet or surface which is insoluble in the coating bath and which exhibits the phenomenon or adhesion. Among such substances are cellulose ester sheets, cellulose ether sheets, and tanned gelatin sheets.

An advantage of the invention consists in the formation of sheets which can be wound in tight rolls or stacked in piles of considerable thickness substantially without adhering to each other. This improvement produces further advantages by saving time in wrapping, and in separating individual sheets from the pile. Other advantages will be apparent.

As many apparently widely different embodiments of this invention may be made without departing from the spirit and scope thereof, it is to be understood that we do not limit ourselves to the specific embodiments thereof except as defined in the appended claims.

We claim:

1. The method of treating a thin, flexible, non-fibrous, cellulose hydrate sheet which comprises coating it in the wet state with a solution containing glycerin and sodium silicate to which a lime salt has been added, and drying before stacking.

2. The method of treating a thin, flexible, non-fibrous, cellulose hydrate sheet which comprises coating it in the wet state with an aqueous solution of sodium silicate to which a lime salt has been added, and drying before stacking.

3. The method of treating a thin, flexible, non-fibrous, cellulose hydrate sheet which comprises passing it in the wet state through an aqueous solution containing sodium silicate, and drying.

4. The method of treating a non-fibrous cellulose hydrate sheet which comprises treating it in the wet state with a solution of sodium silicate, and drying.

5. The method of treating a non-fibrous cellulose hydrate sheet which comprises coating it with a solution containing sodium silicate and a lime salt, and drying.

6. The method of treating a thin, flexible, non-fibrous, cellulose hydrate sheet which comprises treating it with a solution containing sodium silicate, and drying.

7. The step in the manufacture of a thin sheet from a regenerable cellulosic solution which comprises passing the sheet before drying through a solution containing sodium silicate.

8. The product resulting from the process of claim 1.

9. The product resulting from the process of claim 2.

10. The product resulting from the process of claim 3.

11. The product resulting from the process of claim 4.

12. The product resulting from the process of claim 5.

13. The product resulting from the process of claim 6.

14. The product resulting from the process of claim 7.

JACQUES EDWIN BRANDENBERGER.
PAUL VANET.